United States Patent
Havlicek et al.

(10) Patent No.: US 6,875,415 B2
(45) Date of Patent: Apr. 5, 2005

(54) RESIN PRECONDITIONING METHODS USING CARBON DIOXIDE AND METHODS FOR PURIFYING HYDROGEN PEROXIDE

(75) Inventors: Mary D. Havlicek, Richardson, TX (US); David L. Snyder, Princeton, TX (US); Joe G. Hoffman, Santa Fe, NM (US); Marshall E. Cummings, Richardson, TX (US)

(73) Assignee: Air Liquide America, LP, Houston, TX (US)

( * ) Notice: Subject to any disclaimer, the term of this patent is extended or adjusted under 35 U.S.C. 154(b) by 210 days.

(21) Appl. No.: 09/824,741

(22) Filed: Apr. 4, 2001

(65) Prior Publication Data

US 2003/0018140 A1 Jan. 23, 2003

(51) Int. Cl.[7] .............................................. C01B 15/01
(52) U.S. Cl. ....................... 423/584; 210/692; 521/26; 521/28; 521/30
(58) Field of Search .............................. 521/26, 28, 30; 210/692; 423/584

(56) References Cited

U.S. PATENT DOCUMENTS

| 3,691,109 | A | * | 9/1972 | Larsen | |
| 4,124,528 | A | * | 11/1978 | Modell | 210/186 |
| 4,172,185 | A | * | 10/1979 | Petheram | 521/26 |
| 4,299,922 | A | * | 11/1981 | Holl et al. | 521/26 |
| 5,200,166 | A | * | 4/1993 | Shiga et al. | 423/584 |
| 5,496,778 | A | | 3/1996 | Hoffman et al. | |
| 5,605,670 | A | * | 2/1997 | Turunen | 423/584 |
| 5,722,442 | A | | 3/1998 | Hoffman et al. | |
| 5,785,820 | A | | 7/1998 | Hoffman et al. | |
| 5,846,386 | A | | 12/1998 | Hoffman et al. | |
| 6,054,109 | A | * | 4/2000 | Saito et al. | 423/584 |
| 6,248,797 | B1 | * | 6/2001 | Dias et al. | 521/26 |
| 6,358,421 | B1 | * | 3/2002 | Newenhizen et al. | 521/26 |
| 6,407,143 | B1 | * | 6/2002 | Even et al. | 521/26 |
| 6,540,921 | B1 | * | 4/2003 | Devos et al. | 210/660 |
| 2003/0165420 | A1 | * | 9/2003 | Oeter et al. | 423/584 |

* cited by examiner

Primary Examiner—Wayne A. Langel
(74) Attorney, Agent, or Firm—Elwood L. Haynes; Linda K. Russell

(57) ABSTRACT

Provided are a preconditioned resin and methods of preparation thereof as well as methods for purifying hydrogen peroxide solutions. The method includes preconditioning an anion exchange resin, wherein an anion exchange resin bed is provided and carbon dioxide gas is passed through the resin bed.

8 Claims, 3 Drawing Sheets

RESIN PRECONDITIONING METHODS USING CARBON DIOXIDE AND METHODS FOR PURIFYING HYDROGEN PEROXIDE

BACKGROUND OF THE INVENTION

1. Field of the Invention

This invention relates to methods of preconditioning a resin and to resins prepared therefrom. The invention also relates to methods of removing ionic impurities from a hydrogen peroxide solution using the preconditioned resin. The invention has particular applicability in the semiconductor manufacturing industry.

2. Description of the Related Art

Hydrogen peroxide ($H_2O_2$) is an important chemical in the semiconductor manufacturing industry. It is commonly used in solutions employed in wafer cleaning processes which are conducted in wet processing stations. For example, the well known piranha clean process employs a solution of hydrogen peroxide and sulfuric acid ($H_2SO_4$) in a ratio of 3:7. Other processes employing hydrogen peroxide solutions include, for example, the RCA SC-1 clean which involves a solution of ammonium hydroxide ($NH_4OH$) and hydrogen peroxide in a ratio of 5:1:1, and the RCA SC-2 clean, which uses a solution of hydrochloric acid (HCl) and hydrogen peroxide in a ratio of 6:1:1.

To reduce the probability of device failure, it is important in semiconductor device fabrication that the materials which contact the wafers being treated be of very high purity. The extreme purity levels required in semiconductor manufacturing are rare and unique among industrial processes. While existing techniques of purifying hydrogen peroxide may significantly reduce the amount of contaminants, solutions of even greater purity are desirable.

Commercial grade hydrogen peroxide is generally produced by the so-called anthraquinone method. This method involves auto-oxidation of anthraquinone, which results in the presence of large amounts of organic and ionic contaminants in solution. The contaminants may either originate from the anthraquinone or from the organic solvents used in preparing the hydrogen peroxide solution from the anthraquinone.

It is conventional practice to treat hydrogen peroxide with an ionic exchange resin to remove the ionic impurities. However, anion exchange resins which have hydroxide as the ion of exchange have been found to be very reactive, thus generating a large amount of heat when utilized to purify solutions of hydrogen peroxide. To overcome this deficiency, conventionally, the hydroxide has been converted to bicarbonate through the use of solutions of ammonium bicarbonate or sodium bicarbonate. Subsequently, the resin is flushed with deionized water and utilized to treat the hydrogen peroxide solution.

There are, however, various problems associated with the use of exchange resins to remove ionic impurities from an aqueous hydrogen peroxide solution. For example, through the use of sodium bicarbonate or ammonium bicarbonate solutions in preconditioning the anionic exchange resins, a significant amount of sodium remains on the treated resin. Thus, when the hydrogen peroxide solution is brought into contact with the pretreated anionic exchange resin, the solution becomes contaminated with sodium.

Additionally, metal contaminants in the resin may contribute to the accelerated decomposition of hydrogen peroxide solution. Decomposition of the solution can be particularly problematic as a result of the exothermic nature of the reaction. The temperature near the zone of contact between the resin and the solution can increase very rapidly, increasing the rate of decomposition. This can result in self-accelerating reaction, possibly terminating in an explosion of the purification equipment.

To meet the requirements of the semiconductor processing industry of providing an ultra-pure hydrogen peroxide solution and to overcome the disadvantages of the related art, it is an object of the present invention to provide novel methods of preconditioning a resin useful in the removal of ionic impurities from a hydrogen peroxide solution the methods can be carried out in a facile and cost effective manner. The invention has particular applicability to preconditioning resins used in the removal of sodium and metal contaminants.

It is another object of the invention to provide resins prepared by the novel preconditioning methods.

It is a further object of the invention to provide methods of removing ionic contaminants from a hydrogen peroxide solution using resins prepared by the novel preconditioning methods.

BRIEF DESCRIPTION OF THE DRAWINGS

The objects and advantages of the invention will become apparent from the following detailed description of the preferred embodiments thereof in connection with the accompanying drawings, in which.

SUMMARY OF THE INVENTION

Figure 1:
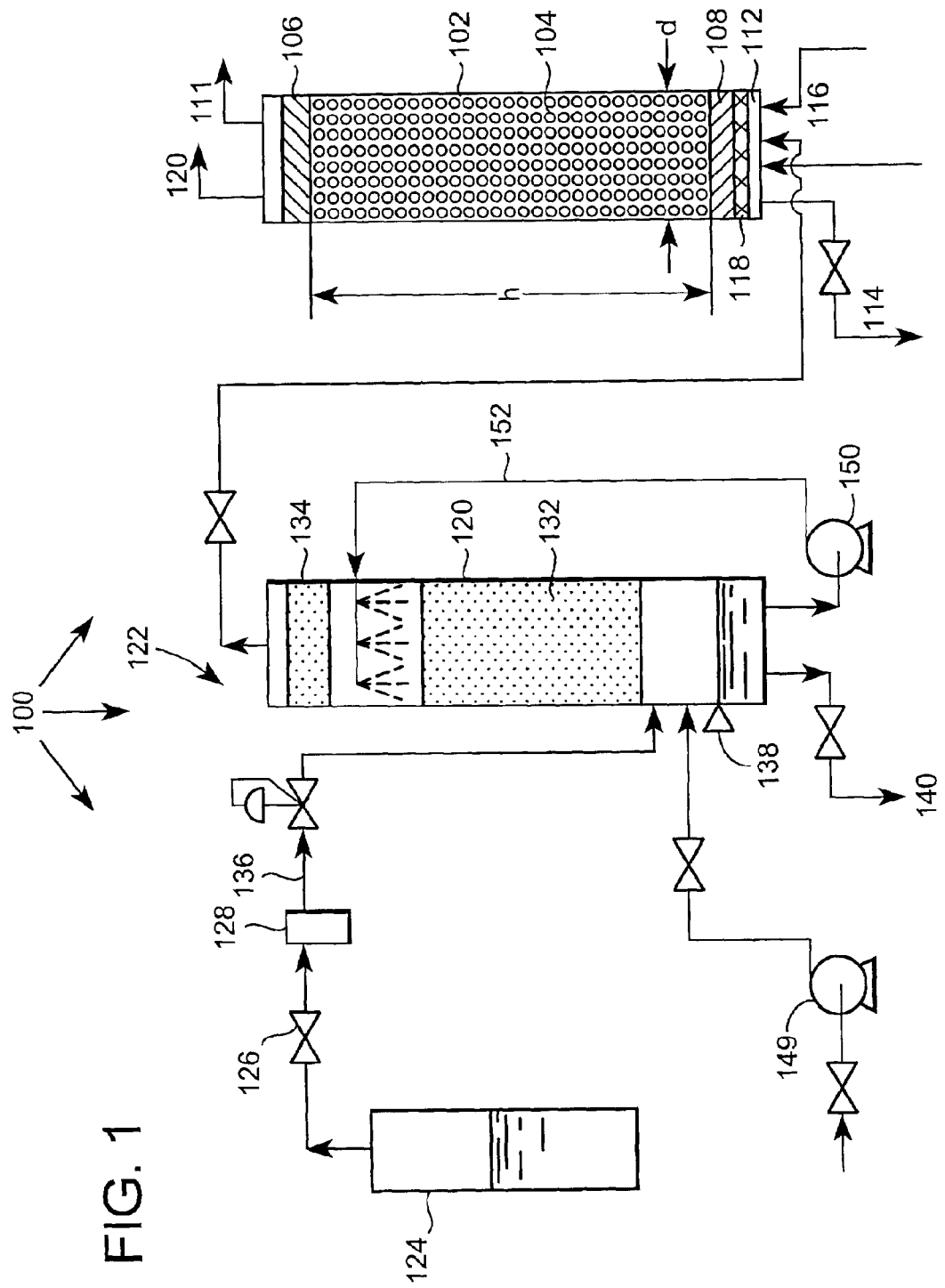
FIG. 1 illustrates an exemplary resin preconditioning apparatus which can be used to practice methods in accordance with the invention.

In accordance with the present invention, an innovative preconditioned resin, methods for preparation thereof and methods for purifying hydrogen peroxide solutions are provided.

In accordance with a first aspect of the invention a method of preconditioning a resin useful for removal of ionic impurities from a hydrogen peroxide solution is provided. The method includes providing an anion exchange resin and passing a stream of carbon dioxide gas through the resin to condition the resin.

In accordance with a further aspect of the invention, a preconditioned anion exchange resin has been provided, wherein a stream of carbon dioxide gas has been passed through the resin.

In accordance with yet another aspect of the invention a method of removing ionic impurities from a hydrogen peroxide solution is provided. The method includes passing the hydrogen peroxide solution through a column having a resin bed wherein the resin bed has been preconditioned by passing a stream of carbon dioxide gas through anion exchange resin.

DETAILED DESCRIPTION OF THE PREFERRED EMBODIMENTS OF THE INVENTION

The invention will now be described with reference to exemplary embodiments thereof. A first aspect of the invention involves a method for preconditioning an exchange resin which can be employed in the removal of ionic impurities from a hydrogen peroxide solution.

The preconditioning method of the present invention can be applied to any anionic resin suitable for removal of ionic impurities from hydrogen peroxide solutions. Of various commercially available resins, DOWEX 550A and DOWEX Monosphere 550A LC NG(OH), available from Dow Chemical, have been found to work particularly well with the invention.

It has now been found that anionic exchange resins can effectively be converted from hydroxide form to bicarbonate form by contacting the resins with carbon dioxide.

The chemical reactions for conditioning the resin with carbon dioxide in water are as follows:

$$H_2O_{(l)} + CO_{2(g)} \leftrightharpoons H_2CO_{3(aq)} \quad (1)$$

$$2\text{Resin-NH}_3^+, OH^-_{(s)} + H_2CO_{3(aq)} \rightarrow (\text{Resin-NH}_3^+)_2, CO_3^{2-}_{(s)} + 2H_2O_{(l)} \quad (2)$$

$$(\text{Resin-NH}_3^+)_2, CO_3^{2-}_{(s)} + H_2CO_{3(aq)} \rightarrow 2\text{Resin-NH}_3^+, HCO_3^-_{(s)} + H_2O_{(l)} \quad (3)$$

The net overall chemical reaction for reaction is shown in equation (4).

$$\text{Resin-NH}_3^+, OH^-_{(s)} + H_2CO_{3(aq)} \rightarrow \text{Resin-NH}_3^+, HCO_3^+_{(s)} + H_2O_{(l)} \quad (4)$$

In the case of preconditioning the resin in dry form with carbon dioxide, the chemical reaction is as follows:

$$2\text{Resin-NH}_3^+, OH^-_{(s)} + CO_{2(g)} \rightarrow 2\text{Resin-NH}_3^+, HCO_3^-_{(s)} + H_2O_{(l)} \quad (5)$$

In accordance with a preferred embodiment of the invention, resin preconditioning can be conducted in situ in an ionic exchange column packed with the resin for hydrogen peroxide purification. In such a case, the resin to be preconditioned is introduced into a column and carbon dioxide gas is passed through the resin preferably in an upflow direction. In this manner, the resin can be converted from a hydroxide form to a bicarbonate form. Preferably, the conversion to bicarbonate is in excess of 99 percent. Alternatively, the resin can be preconditioned in a suitable container outside the hydrogen peroxide purification system. In such case, the preconditioned resin can be stored for later use and transferred into the purification column at such time.

FIG. 1 illustrates a system 100 for in situ preconditioning of the resin. A hydrogen peroxide purification column 102 is preferably constructed from a material compatible with the resin and other chemicals (e.g., hydrogen peroxide) which contact the column in order to avoid contamination. Preferred materials include, for example, polypropylene, polyethylene and polyvinylidene fluoride (PVDF), etc.

The column 102 has a resin bed area 104 which is defined at an upper end and lower end by liquid and gas permeable members such as mesh screens 106, 108. The diameter d and height h of the resin bed will depend on the production scale and can be readily apprized by those skilled in the art. Typically, the bed is from about 10 to 60 cm in diameter, and from about 90 to 300 cm in height. The upper screen 106 is preferably disposed a distance of from about 2 to 10 cm from the top of the column 102, and the lower screen 108 is preferably disposed a distance of from about 2 to 10 cm from the bottom of the column.

The column is connected to receive a flow of high purity water through a water inlet 112. The water can be drained from the column through a drain line 114 which may be connected to waste. The high purity water is typically deionized water, a central source (not shown) for which is generally present in semiconductor manufacturing facilities.

The column is further connected to receive carbon dioxide gas from a carbon dioxide source through carbon dioxide inlet 116. Preferably, the carbon dioxide inlet 116 is connected to the column at a point below the lower screen 108 such that the gas can spread across the width of the column and flow upwardly through the resin. To provide a uniform flow in the column, the inlet 116 preferably is connected to a homogenizer 118 which is effective to provide a uniform gas flow across the column width. After passing through the column, the carbon dioxide is removed through carbon dioxide outlet 120 at a point above the upper screen 106.

In accordance with a preferred aspect of the invention, the preconditioning can be performed by bubbling the carbon dioxide through the resin bed. In this embodiment, after introducing the fresh resin to be preconditioned into the ion exchange column 102, high purity water is introduced into the column through water inlet 112 until the resin is covered. This can be judged visually or by use of a known liquid level sensor. Next, the carbon dioxide gas is introduced into column 102 through inlet 116. The gas is bubbled through the resin bed until the anion exchange resin is substantially converted to bicarbonate ($HCO_3$) form. Preferably, greater than 90%, more preferably greater than 95%, of available sites on the resin are converted. Typically, the carbon dioxide contact time for 95% conversion is from about 180 to 240 minutes.

A suitable flow rate and pressure of the carbon dioxide gas introduced into the ion exchange column will depend on factors such as resin bed height and diameter, packing density of the resin, and process time. For a bed height of from about 90 to about 200 cm and diameter of from about 10 to about 30 cm, the carbon dioxide flow rate is typically from about 15 to about 60 sccm at a pressure of from about 15 to about 40 psig.

In accordance with further and less preferred aspects of the invention, the preconditioning can be performed with the resin in a dry or a moist state, without bubbling the carbon dioxide gas into water. In such a case, carbon dioxide is simply passed through the dry or moist resin bed.

The carbon dioxide gas introduced into the column is preferably in an ultra-high-purity form. As used herein, the term "ultra-high-purity" includes impurity levels of less than about 0.001%, preferably less than about 0.001%. However, higher concentrations of non-contaminating impurities such as oxygen, nitrogen and water are acceptable.

In accordance with a preferred aspect of the invention, the carbon dioxide gas is purified prior to introduction into the column 102 by an ionic purifier unit 122. Ionic purifiers have been described for use in the purification of ammonia (U.S. Pat. Nos. 5,496,778, and 5,846,386); hydrogen chloride (U.S. Pat. No. 5,846,387); hydrogen fluoride (U.S. Pat. Nos. 5,785,820 and 5,722,442); and various other chemicals (copending applications Ser. Nos. 07/824,765 and 07/824,767, both filed on Apr. 4, 2001. The entire contents of these documents are incorporated herein by reference.

The ionic purifier operates on the basis of liquid-vapor contact, whereby the vapor phase (carbon dioxide) becomes purified and the liquid phase becomes contaminated with impurities stripped from the vapor phase. Liquid carbon dioxide is stored in a reservoir or gas cylinder 124. The carbon dioxide is drawn from the vapor space in the reservoir, and is then passed through a shutoff valve 126 and a filter 128. The filtered carbon dioxide is introduced into an ionic purifier column 120, which contains a packed section 132 and a mist removal pad 134, through line 136. As the carbon dioxide passes up through the column 120, it comes into intimate countercurrent contact with downward flowing high purity water introduced at a top portion of the column 120. In the exemplified ionic purifier, the water is drawn from a bottom portion of the column 120 and is recirculated. In such case, the liquid becomes nearly saturated with carbon dioxide, and is recirculated by pump 150, via line 152. Alternatively, the high purity water can be passed through the column without recirculation. The liquid level in the column 120 is controlled by a level sensor 138. Waste 140 is drawn off periodically from the retained liquid at the bottom of the column 120. The high purity water, preferably deionized water, is supplied to the column 120 with elevated pressure maintained by a pump 149. The purified carbon dioxide gas is removed from a top portion of the ionic purifier column and is introduced into the ion exchange column 102 to precondition the resin.

After preconditioning of the resin with the carbon dioxide gas, a hydrogen peroxide solution 110 can be directed through column 102, and routed to a point of use such as a semiconductor processing tool. The column 102 typically is one of a plurality of columns for purifying the hydrogen peroxide solution.

In order to further illustrate the methods in accordance with the invention, the following examples are given, it being understood that same are intended only as illustrative and in no way limiting.

EXAMPLES

The following Example 1 was conducted to determine the extent of conversion of the resin to bicarbonate form as a function of preconditioning time with the carbon dioxide.

Example 1

DOWEX Monosphere 550A LC NG(OH) resin manufactured by Dow Chemical Corp. in Midland, Mich., was placed in a polypropylene column mounted in a vertical position. The column was 51 inches (129.5 cm) in length and 8 inches (20.3 cm) in diameter. The column had a sealed bottom and a removable lid disposed on the upper end of the column. The resin was positioned in the column by polypropylene mesh screens about 27 inches (68.5 cm) apart. The screen at the lower portion of the column was disposed about 3 inches (7.6 cm) from the bottom of the column. VITON-encapsulated O-rings were employed with the screens to ensure that the resin was held in position as carbon dioxide was passed therethrough.

Deionized water was introduced into the column until the resin was covered. Next, supercritical fluid extraction grade carbon dioxide gas from a gas cylinder was introduced into the column in a controlled manner via a TEFLON tube. The gas was bubbled through the mixture of resin and deionized water. In order to facilitate the flow of carbon dioxide gas, the gas cylinder was heated by a heat gun. The contents in the column became warm due to the reaction of the carbon dioxide gas and the resin in hydroxide form. The carbon dioxide was passed over the resin for a total of five hundred and fifty minutes.

The ionic form of the resin prepared was subsequently determined as follows. First, 250 ml of deionized water was passed over the resin. Thereafter, 150 ml of a sodium chloride solution having a concentration of 1N was passed over the resin, followed by 250 ml of deionized water for a fluid volume of 400 ml. The sodium chloride solution and the final 250 ml of water was collected and the pH was measured with pH sticks. The volume of the sodium chloride and the final water rinse was measured and recorded. Aliquots were titrated with standard 1.7551 N hydrochloric acid using phenolphthalein and a pH meter to determine the end points. The ionic form was then determined by the equation:

$$\frac{equivalents \text{HCO3}}{equivalents \text{CO3}} = \frac{V_T - 2V_P}{2V_P}$$

where $V_T$=volume of acid to acid end point and $V_P$=volume of acid to basic (phenolphthalein) end point.

The anion exchange capacity for the $CO_2$ conditioned samples was calculated and is listed in Table 1 below.

TABLE 1

| Sample | V1 | Vt | Vap pH8.3 | Vam pH4.5 | Vat | AEC | $HCO_3/CO_3$ | $\Delta T°$ C. | Time |
|---|---|---|---|---|---|---|---|---|---|
| No. 1 | 98 | 305 | 2.0 | 6.4 | 6.4 | 0.945 | 0.6/1 | 8 | 210 |
| No. 2 | 98 | 325 | 1.0 | 6.1 | 8.1 | 0.910 | 2.1/1 | 2 | 330 |
| No. 3 | 95 | 310 | 0 | 8.1 | 8.1 | 1.105 | >99/1 | 0 | 430 |
| No. 4 | 100 | 335 | 0 | 8.05 | 8.05 | 1.183 | >99/1 | 0 | 550 |
| No. 5 | 100 | 360 | 0 | 7.85 | 7.85 | 1.181 | >99/1 | 0 | 550 |

RESIN: DOW 550A, conditioned with $CO_2$ gas.
V1 = Volume of aliquot titrated, ml
Vt = Volume of eluant from resin treated with 1 N NaCl, ml
$\Delta T°$ C. = Temperature increase above ambient temperature, ° C.
Vap = Volume of standard acid titrated to reach pH 8.3, neutralization of OH and $CO_3$, ml
Vam = Volume of standard acid titrated to reach pH 4.5, neutralization of $HCO_3$, ml
Vat = Volume of standard acid titrated to reach pH 4.5, ml
AEC = Anion Exchange Capacity, meq/ml resin or equivalents/liter resin
$HCO_3/CO_3$ equivalent ratio of resin in $HCO_3$ form to resin in $CO_3$ form
Time = Cumulative time of exposure of 21 l resin to $CO_2$ gas, minutes Upon review of the results reported in Table 1, it can be seen that greater than 99% conversion of the DOWEX 550 resin from the hydroxide to bicarbonate form was achieved in Sample No. 3 after in such a short a period as 430 minutes of exposure to the $CO_2$. No measurable improvement between 430 and 550 minutes was detected. Thus, as the temperature increase, an exothermic neutralization occurs. The OH is now $HCO_3$ on the resin and complete conversion has taken place.

The following Examples 2–7 compare the extent of conversion of the resin to bicarbonate form for resins in different forms (i.e., dry, moist and wet). The experiments were conducted at 21° C. as follows:

Example 2

Dry Resin: 50 ml of DOWEX 550A Monosphere LC NG (OH) resin, was placed in a glass column (Spectra/Chrom) (2.5 cm×30 cm) having TEFLON fittings and tubing attached thereto. The TEFLON tubing connected to the bottom of the column was attached to a stainless steel regulator (Alphagaz 2606) on a cylinder of supercritical fluid extraction grade carbon dioxide gas. Carbon dioxide gas was passed over the resin at 30 psig for 12 minutes. The column became warm to the touch, then cooled to ambient temperature after five minutes.

Example 7

Resin in Water: 50 ml of deionized water and 50 ml DOWEX 550A Monosphere LC NG (OH) resin were placed in the same column used in Example 2. Carbon dioxide gas was passed over the resin at 30 psig for a total of 60 minutes.

The ionic form and extent of conversion of the resins in each of Examples 2–7 was subsequently determined as described above in Example 1, and the results are reported in Table 2 below.

TABLE 2

| EXAMPLE | TIME | $CO_2$ | $CO_2$/Resin | Vi | Vt | Vap | Vam | Vat | AEC | % $HCO_3$ | $HCO_3/CO_3$ |
|---|---|---|---|---|---|---|---|---|---|---|---|
| 2. Dry Resin | 12 | 240 | 170 | 100 | 420 | 0.25 | 6.5 | 6.8 | 1.0 | 93 | 12.5/1 |
| 3. Resin + 50 ml $H_2O$ | 10 | 170 | 140 | 100 | 412 | 0.15 | 6.85 | 7.0 | 1.0 | 95 | 22/1 |
| 4. Moist Resin* | 15* | 0 | 0 | 100 | 400 | 3.50 | 3.54 | 7.04 | 1.0 | 0.6 | 6/1000 |
| 5. Moist Resin | 15 | 255 | 210 | 100 | 420 | 1.60 | 5.35 | 6.95 | 1.0 | 55 | 1.2/1 |
| 6. Resin + 50 ml $H_2O$ | 15 | 255 | 210 | 100 | 410 | 0.15 | 6.85 | 7.00 | 1.0 | 95 | 22/1 |
| 7. Resin + 50 ml $H_2O$ | 60 | 1020 | 850 | 100 | 410 | 0.10 | 6.90 | 7.00 | 1.0 | 97 | 34/1 |

*Carbon dioxide pressure decreased from 30 psi to <1 psi during treatment for this sample. The experiment was repeated as Sample 4. On this regulator, 60 psi corresponded to 28 1/min, and 30 psi corresponded to 17 1/min.
TIME = *$CO_2$ contact time, minutes
$CO_2$ = volume of $CO_2$ introduced into the column, $cm^3$
$CO_2$/Resin, volume $CO_2$/volume resin ratio of equivalents
Vi = volume of aliquot used in titration, ml
Vt = volume of NaCl plus column rinse, ml
Vap = volume acid titrated to phenolphthalein end point, ml
Vam = volume acid titrated to methyl red end point (calculated from AEC), ml
Vat = volume acid titrated, total (calculated from AEC), ml
AEC = anion exchange capacity from Dow Certificate of Analysis eq/l
%$HCO_3$ = % $HCO_3$ form of anion on resin on equivalent basis
$HCO_3/CO_3$ = ratio of equivalents of resin in bicarbonate form to equivalents of resin in carbonate form

Example 3

Resin in Water: 50 ml of deionized water and 50 ml DOWEX 550A Monosphere LC NG (OH) resin were placed in the same column used in Example 2. Carbon dioxide gas was passed over the resin at 30 psig for 12 minutes. The column became warm to the touch, then cooled to ambient temperature after five minutes.

Example 4

Moist Resin: 50 ml DOWEX 550A Monosphere LC NG (OH) resin and deionized water were placed in a glass column as described in Example 2. The water was drained from the resin and discarded. Carbon dioxide gas was passed over the resin at 30 psig initially. However, the pressure dropped to <1 psig during the 15 minutes of reaction as a result of regulator malfunction.

Example 5

Moist Resin: 50 ml DOWEX 550A Monosphere LC NG (OH) resin and 50 ml 50 ml deionized water were placed in a glass column as described in Example 2. The water was drained from the resin and discarded. Carbon dioxide gas was passed over the resin at 30 psig for a total of 15 minutes.

Example 6

Resin in Water: 50 ml of deionized water and 50 ml DOWEX 550A Monosphere LC NG (OH) resin were placed in the same column used in Example 2. Carbon dioxide gas was passed into the column and over the resin at 30 psig for a total of 15 minutes.

These examples demonstrate that an anion exchange resin can be easily pre-conditioned in a relatively quick and facile manner from a hydroxide form to the bicarbonate form. Preconditioning of the dry resin (Example 2) resulted in a relatively high conversion to bicarbonate form of 93%. The mixture of water and resin provided the most effective means for achieving the reaction. In particular, Examples 3, 6 and 7 resulted in conversions of 95, 95 and 97%, respectively, to the bicarbonate form. It can also be seen that increasing $CO_2$ exposure time from 10 minutes (Example 3) to 60 minutes (Example 7), did not significantly affect the conversion of hydroxide to bicarbonate. In fact, shorter exposure times may be more advantageous in that they may lower any contamination imparted to the resin by the carbon dioxide gas.

Purification of Hydrogen Peroxide

Figure 2:
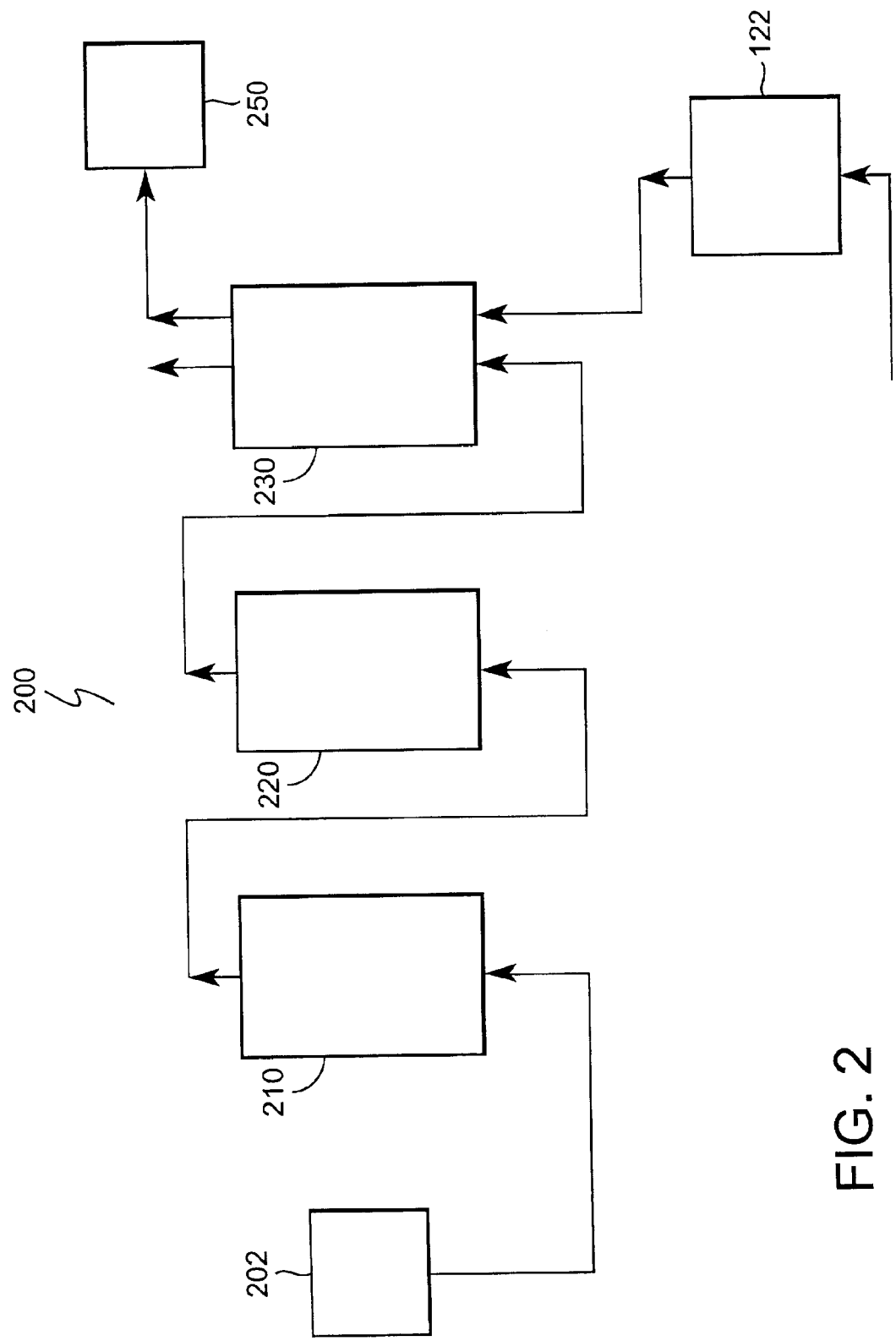
FIG. 2 is a schematic diagram of a hydrogen peroxide purification system which can be used to practice an aspect of the present invention.

In accordance with a further aspect of the invention, a hydrogen peroxide solution can be purified by contacting the solution with an anion exchange resin preconditioned with carbon dioxide as described above. The anion exchange column is typically used in a sequence which also includes a TOC (total organic carbon) removal column and a cation exchange column. One or more of each of these types of columns can be employed. While the order of columns may be varied, the TOC column is conventionally first in the sequence, followed by the anion and then the cation exchange column, or the cation and then the anion exchange column. Suitable resins for use in these columns are well known. An exemplary hydrogen peroxide purification process in accordance with the invention is illustrated in FIG. 2.

First, a hydrogen peroxide solution from source 202 is introduced into a TOC removal column 210 for removal of organic impurities. A typical hydrogen peroxide feed stock solution contains less than 10 parts-per-billion (ppb) impurities, and the impurities can be reduced to about 100 parts-per-trillion (ppt) or less through the process. The solution can be, for example, a 30% by weight solution. Next, the solution is introduced into a cation exchange column 220 and an anion exchange column 230, disposed in series. Any number of the purification columns may be employed and disposed in the particular order desired.

Controlling the flow rate of the solution through the columns can be performed using any conventional method. For example, the column can be connected to a metering pump (not shown) which controls the flow rate of the solution through the resin. The solution can be passed through a heat exchanger prior to introduction into the columns to cool the solution to a desired temperature, for example from about 5 to about 25° C.

The hydrogen peroxide solution is preferably passed through the columns in an upflow direction as this can provide various advantages. For example, upflow processing allows any gas generated from decomposition reactions to rise to the top of the column to be vented. Passing the hydrogen peroxide in an upflow direction is also advantageous in avoiding the formation of dry spots in the resin bed, thus reducing the risk of overheating and/or channeling.

The purified hydrogen peroxide solution exiting the last of the purification columns can be introduced directly to one or more points of use, for example, one or more semiconductor processing tools 250 employing hydrogen peroxide. The processing tools can be, for example, wet processing stations containing a cleaning solution which includes the hydrogen peroxide. Alternatively, the purified solution exiting the last of the columns can be introduced into storage (qualification) tanks prior to delivery to the point(s) of use. Preferably, the purification takes place on site with the point of use, i.e., an onsite chemical purifier (OSCP).

In order to further illustrate the purification process of a hydrogen peroxide solution using the pre-conditioned resin and the advantages thereof, the following specific examples are given, it being understood that same are intended only as illustrative an in no way limitative.

Example 8

One of the objectives of this test was to determine if metallic contamination could be reduced with the $CO_2$-preconditioning method of the invention. If the cation column was to be employed in the last processing step it would largely remove any metallic impurities from the anion column. Thus, for the purpose of this test the columns were installed in the sequence cation→anion. To simplify the test, low TOC-feed material was used and the TOC column was not filled with resin. The cation column was packed with a DOWEX 650C cation exchange ion in the acid form wherein the resin was not preconditioned beyond rinsing with deionized water.

An 8 inch (20.3 cm) diameter by 45 inch (114.3 cm) height polyethylene column was filled with 15l of DOWEX 550A LCNG(OH) resin. The column was subsequently filled with deionized water to wet the resin. The column was fitted with a dispersion plate for $CO_2$ gas through which filtered $CO_2$ gas was bubbled. This allowed the gas to disperse in the water soaked resin, allowing the formation of carbonic acid. The carbonic acid reacted with the mobile hydroxide ions of the anion-exchange resin, causing formation of the carbonate and bicarbonate ions as the mobile ions on the anion exchange resin. The hydroxide ions formerly present in the anion-exchange resin underwent neutralization and became water, leaving the less alkaline bicarbonate ions present in a 50/1 ratio, with hydroxide ions present in an amount of 2 ppm.

The column parameters for the $CO_2$ preconditioning are as shown below in Table 3:

TABLE 3

| | |
|---|---|
| Height, in (cm) | 45 (114.3 cm) |
| Diameter, in (cm) | 8 (20.3 cm) |
| Height of Mixture, in (cm) | 36 (91.4 cm) |
| Column Volume, l | 91 (231.1 cm) |
| Water Volume, l | 58 |
| Resin Volume, l | 15 |
| Volume of mixture, l | 73 |
| Column Material | Polypropylene |
| Resin | DOWEX 550A LC NG(OH) |
| Gas Pressure, psig | 20 |
| Gas Flow Rate, SCHF | 20 |

Following the conditioning of the resin, a 30% by weight hydrogen peroxide solution was introduced at a flow rate of 1.2 l/min. Samples from the anion exchange column were taken at two hour intervals, and a sample of the feed solution was taken prior to entry into the anion exchange column. The sodium levels found are listed below in Table 4. These results are graphically illustrated in FIG. 3, where the hydrogen peroxide solution treated with the conditioned resin is represented by the plotted points configured as squares, as further explained below.

TABLE 4

| Sample | Time | Sodium, ppb |
|---|---|---|
| Feed (prior to cation column) | — | 1.42 |
| Sample-1 | 2 hours | 0.04 |
| Sample-2 | 4 hours | 0.02 |
| Sample-3 | 6 hours | 0.02 |
| Sample-4 | 8 hours | <0.01 |

Comparative Example 1

The same procedure carried out in Example 8 was repeated except that the anion-exchange resin utilized was a DOWEX A(OH) converted to DOWEX 550A($HCO_3$) by preconditioning the resin with sodium bicarbonate and then rinsing it with deionized water. Sampling was performed as in Example 8 except the samples were collected at three-hour intervals. The sodium levels found are listed below in Table 5. These results are graphically illustrated in FIG. 3, where the hydrogen peroxide solution treated with the conditioned resin is represented by the plotted points configured as diamonds, as further explained below.

TABLE 5

| Sample | Time | Sodium, ppb |
|---|---|---|
| Feed | — | 1.42 |
| Sample-1 | 3 hours | 0.13 |
| Sample-2 | 6 hours | 0.12 |
| Sample-3 | 9 hours | 0.12 |

Figure 3:
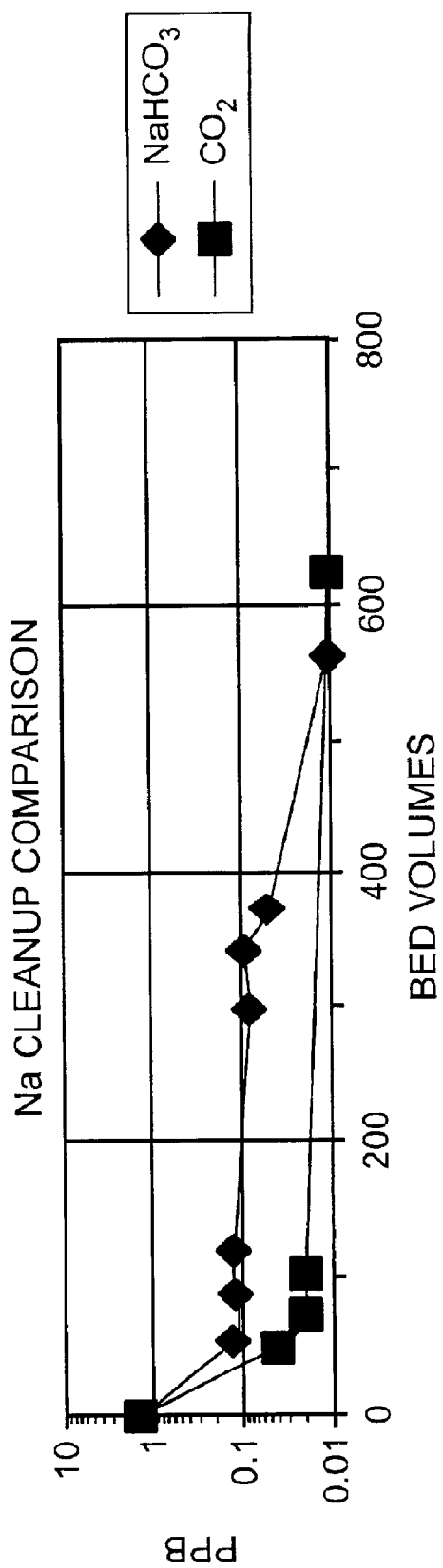
FIG. 3 is a graph illustrating the level of sodium in a solution of thirty percent hydrogen peroxide versus bed volumes of hydrogen peroxide.

The results in Tables 4 and 5 confirm that sodium impurities are removed from the hydrogen peroxide solution at a considerably greater rate for the carbon dioxide preconditioned anion-exchange resin than the resin preconditioned with sodium bicarbonate in the conventional manner. FIG. 3 is a graph of sodium concentration in the hydrogen peroxide solution versus the number of bed volumes treated for the anion exchange resin pretreated with carbon dioxide and the conventional bicarbonate preconditioned resin. The carbon dioxide preconditioned resin resulted in a lower level of sodium in 75–550 bed volumes of the treated 30% hydrogen peroxide solution than the conventional preconditioned anion exchange resin. At 550 bed volumes and above, the sodium level dropped to less than 0.01 ppb for both resins.

The following examples were performed to demonstrate the extent of metal leaching from carbon dioxide preconditioned resins and conventionally preconditioned resins. The resin was tested for metal contamination as such contamination was leached from the resin when water, dilute nitric acid and aqua regia were passed over the resin. These tests were designed to see how much sodium and other common metal contaminants leached from the resin into deionized water, dilute nitric acid, and aqua regia. Each leaching material is a progressively stronger leaching agent.

Example 9

Fifty grams of DOWEX 550A resin was preconditioned with carbon dioxide by bubbling in 50 ml of water for 30 min at 30 psig. The resin was placed in a 1 inch (2.5 cm) by 12 inch (30 cm) column. The bottom of the column was connected to a ProMinent Gamma G/4b metering pump operated at 115 V and 50 to 60 Hz. A flow rate of 50 ml/min through the column for the liquids was obtained. Deionized water was passed through the resin and composite samples were collected for 0–200 bed volumes (0–10,000 ml) and 201–400 bed volumes (10,000–20,000 ml). Thereafter, the feed was changed over to nitric acid having a concentration of 0.1 N. Composite samples were collected at 0–200 bed volumes and 201–400 bed volumes. These samples were each tested for iron and sodium. The results are shown in Table 6.

Comparative Example 2

The same procedure as in Example 9 was carried out, with the exception of the method of preconditioning the resin. The anionic resin employed in the column was DOWEX 550A which had been converted to bicarbonate through use of a 94 g/l sodium bicarbonate solution and deionized water rinsing FAB.H202.ORG.24. One hundred liters of DOWEX 550A(OH) was rinsed with 375 l of water and then with 94 g/l $NaHCO_3$ in water for 38 min (300 l/h) in the downward direction. Thereafter, the resin is treated with 94 g/l $NaHCO_3$ for 38 minutes (300 l/h) in the upward direction. The resin was subsequently rinsed with deionized water for 30 min (300 l/h) until the conductivity becomes 10 U.S. DOWEX 550 A(OH) was rinsed with deionized water (5 bed volumes) and drained, leaving 2 cm of water above the resin for treatment. The results are shown below in Table 6.

TABLE 6

| Example | Resin | BV $H_2O$ | BV $HNO_3$ | Fe, µg/kg | Na, µg/kg | Fe, µg/kg TOTAL | Na, µg/kg TOTAL |
|---|---|---|---|---|---|---|---|
| 9 | $HCO_3$, U | 0–200 | 0 | <0.2 | 20 | | |
| 9 | $HCO_3$, U | 201–400 | 0 | <0.2 | 2.2 | <0.2 | 22 |
| 9 | $HCO_3$, U | 400 | 0–200 | 1.4 | 6.72 | | |
| 9 | $HCO_3$, U | 400 | 201–400 | 1.0 | 1.48 | 2.4 | 8.2 |
| 9 | $HCO_3$, U | 400 | 400 | | | 2.4 | 30.2 |
| Comp. 1 | $HCO_3$, F | 0–200 | 0 | 0.36 | 40.0 | | |
| Comp. 1 | $HCO_3$, F | 201–400 | 0 | 3.56 | 304 | 3.92 | 344 |
| Comp. 1 | $HCO_3$, F | 400 | 0–200 | 9.24 | 41.5 | | |
| Comp. 1 | $HCO_3$, F | 400 | 201–400 | 36.8 | 4.84 | 46 | 46 |
| Comp. 1 | $HCO_3$, F | 400 | 400 | | | 49.9 | 390 |

U = carbon dioxide conditioned resin
F = sodium bicarbonate conditioned resin

Upon review of the data, it can be seen that sodium and iron contaminants were surprisingly leached into the water and the nitric acid to a significantly lesser degree from the carbon dioxide preconditioned resin than the conventionally preconditioned resin.

Example 10

One gram samples of preconditioned DOWEX 550A resin were prepared as described in Example 9 and comparative Example 2 below. The treatment of the resin was as described below with reference to Table 7.

TABLE 7

| Resin | Preconditioning | Treatment |
|---|---|---|
| OH | NONE | NONE |
| $HCO_3$ | $CO_2$ | NONE |
| $NO_3$ | $CO_2$ | $H_2O$ + 0.1N $HNO_3$ |

The samples were subsequently leached with 5.0 ml of aqua regia (3 parts hydrochloric acid to 1 part nitric acid) at ambient temperature for three hours each. The leachate was then tested for iron and sodium metal contamination using ICP emission spectroscopy. The results are shown below in Table 7.

Comparative Example 2

The same procedure as in Example 10 was used with the exception of the resin preconditioning method, which involved use of a sodium bicarbonate solution. The results of the metal contamination testing is shown below in Table 9.

TABLE 8

| Resin | Preconditioning | Treatment |
|---|---|---|
| $HCO_3$ | $NaHCO_3$ | NONE |
| $NO_3$ | $NaHCO_3$ | $H_2O$ + 0.1N $HNO_3$ |

The results of metal contaminants by the DOWEX 550A resin conditioned by both methods is tabulated below in Table 9:

TABLE 9

| Example | Resin | Fe, µg/kg | Na, µg/kg |
|---|---|---|---|
| 10 | OH | 15660 | 10800 |
| 10 | HCO₃, U | 12820 | 2000 |
| 10 | NO₃, U | 7040 | 1600 |
| Comp. 2 | HCO₃, F | 76000 | 93600 |
| Comp. 2 | NO₃, F | 33460 | 2000 |

U = carbon dioxide conditioned resin
F = sodium bicarbonate conditioned resin

Upon review of the results, it can bee seen that sodium and iron contaminants were surprisingly leached into the aqua regina to a much lesser degree from the carbon dioxide preconditioned resin than the conventionally preconditioned resin.

While the invention has been described in detail with reference to specific embodiments thereof, it will be apparent to those skilled in the art that various changes and modifications can be made, and equivalents employed, without departing from the scope of the claims which follow.

What is claimed is:

1. A method of purifying a hydrogen peroxide solution in the absence of calcium carbonate, comprising:
   (a) providing an anion exchange resin bed contained within a column,
   (b) providing ultra-high purity carbon dioxide gas,
   (c) passing said ultra-high purity carbon dioxide gas through said anion exchange resin bed, thus forming an ion exchange resin in the bicarbonate form, and
   (d) passing the hydrogen peroxide solution through said column containing said anion exchange resin bed.

2. The method of claim 1, wherein the hydrogen peroxide solution has a hydrogen peroxide concentration of 50 weight percent or less.

3. The method according to claim 1, wherein the resin is a DOW 550® anionic exchange resin.

4. The method according to claim 1, wherein the hydrogen peroxide solution is passed through the column in an upflow mode.

5. The method according to claim 1, further comprising passing the hydrogen peroxide solution through a second ion exchange column in series with the first column.

6. The method according to claim 5, wherein said second column contains a cation exchange resin.

7. The method according to claim 5, further comprising passing the hydrogen peroxide solution through a third column for removing total organic carbon impurities in said hydrogen peroxide solution, wherein the said third column is connected in series with and upstream of the first and second columns.

8. The method according to claim 1, wherein ionic impurities are removed from a hydrogen peroxide solution.

* * * * *